J. F. STEWARD.
SUPPORT FOR HARVESTING MACHINE REELS.
APPLICATION FILED SEPT. 16, 1912.
1,056,718.
Patented Mar. 18, 1913.
2 SHEETS—SHEET 1.
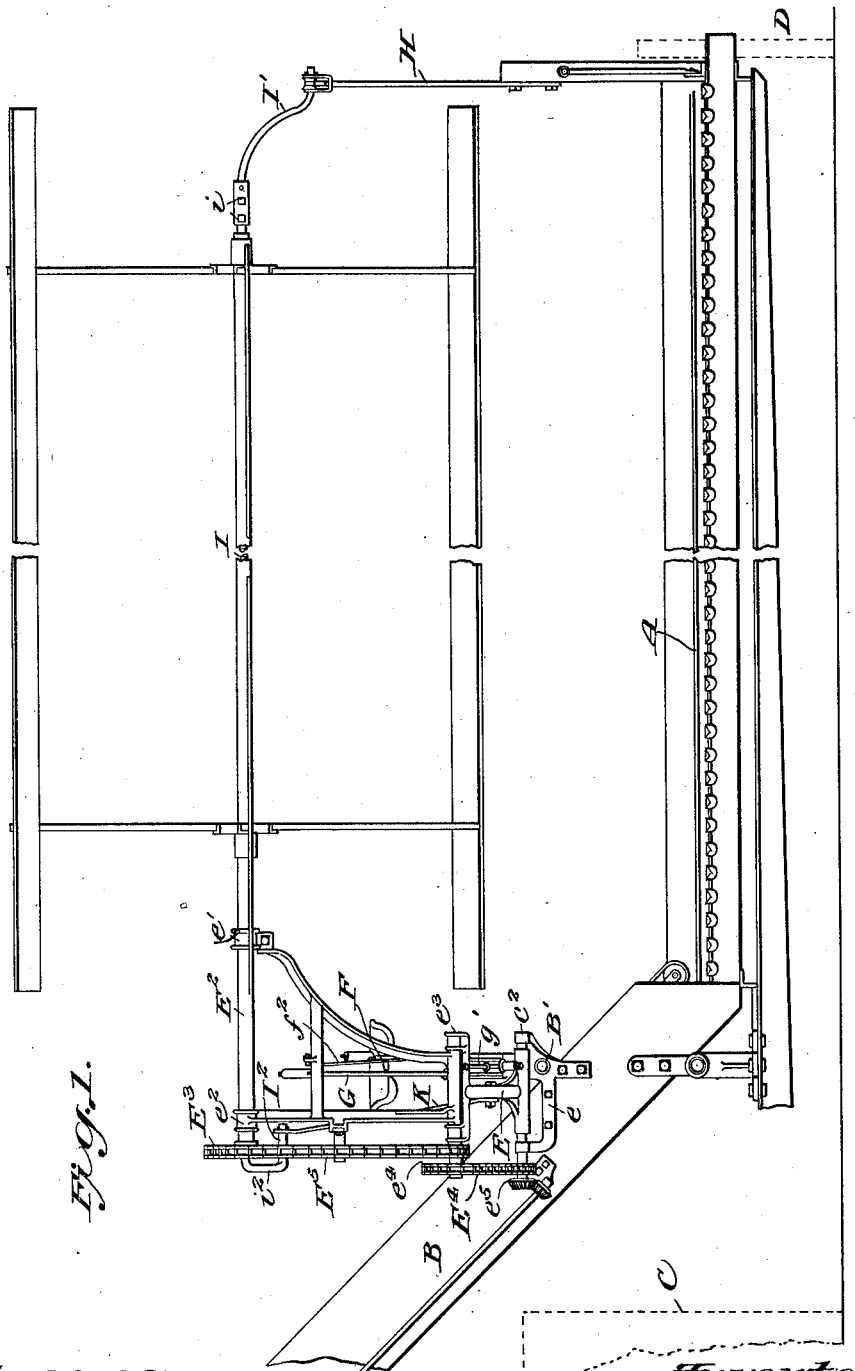
Witnesses:
F. W. Hoffmeister
C. C. Palmer
Inventor:
John F. Steward J. F. STEWARD.
SUPPORT FOR HARVESTING MACHINE REELS.
APPLICATION FILED SEPT. 16, 1912.
1,056,718.
Patented Mar. 18, 1913.
2 SHEETS—SHEET 2.
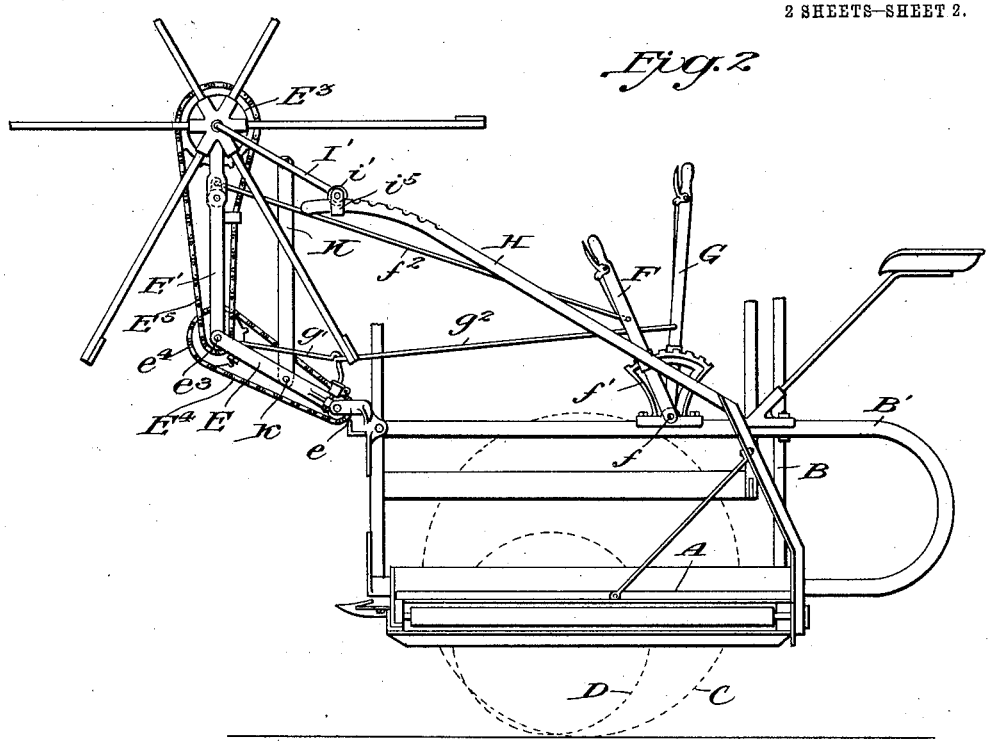
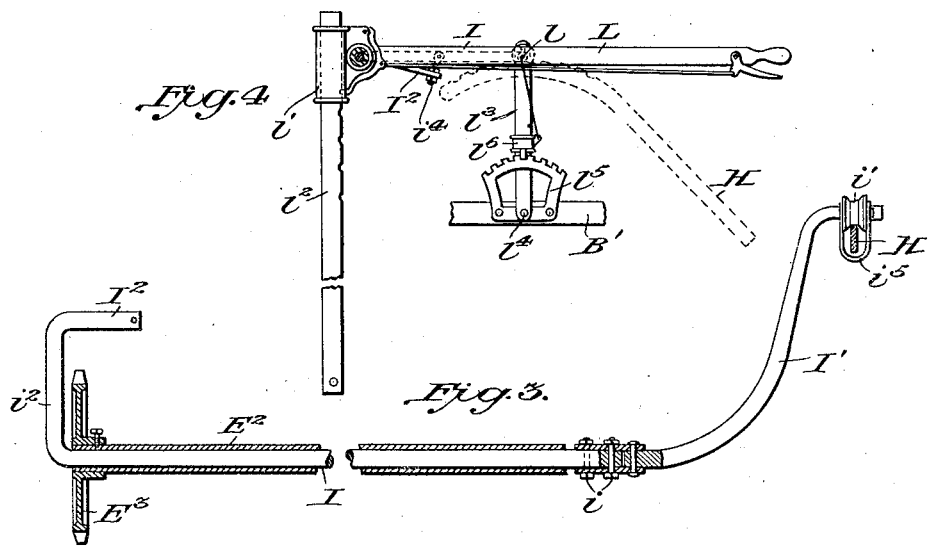
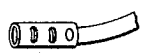
Witnesses:
Inventor:

UNITED STATES PATENT OFFICE.

JOHN F. STEWARD, OF CHICAGO, ILLINOIS.

SUPPORT FOR HARVESTING-MACHINE REELS.

1,056,718.  Specification of Letters Patent.  Patented Mar. 18, 1913.

Original application filed April 10, 1911, Serial No. 620,007. Divided and this application filed September 16, 1912. Serial No. 720,480.

*To all whom it may concern:*

Be it known that I, JOHN F. STEWARD, a citizen of the United States, residing at Chicago, in the county of Cook and State of Illinois, have invented certain new and useful Improvements in Supports for Harvesting-Machine Reels, of which the following is a specification, reference being had to the accompanying drawings.

The object of my invention is to provide a support for the grain-end of reels, or an added support sufficiently efficient to keep steady the grain-end of reels that, in most cases, are provided with a practically efficient support at the stubble end in machines not of wide cut.

The generic idea upon which the present construction is founded is shown in patent granted to E. A. Johnston, No. 829,016, dated August 21, 1906, and the improvement consists in a modification thereof whereby it is adapted to stubbleside reel supports of harvesting machines, which supports consist in two members jointed together, a common form of which is shown in Figures 1 and 2 of the drawings forming part of this application, which is a division of application filed by me April 10, 1911, Serial No. 620,007. Broadly considered, this invention is covered by the application of which this one is a division.

The basic thought of the form herein shown and claimed consists in the adoption of parallelogram mechanism whereby the bar upon which the reel rotates is controlled.

In the drawings—Fig. 1 is a front view of such parts of a harvesting machine as necessary to illustrate my invention. In this instance the added reel support being adapted to one of the more complicated forms of harvester reel; Fig. 2 is a grainside elevation; Fig. 3 is a bar extending from the grainside to the stubbleside of the machine upon which the tubular reel shaft revolves; Fig. 4 is a form of embodiment of the generic idea covered by the claims of my original application, and is here retained in order to show one of the best forms of adjustment for the outer end of the reel supporting bar shown in Fig. 1, where the stubble end of the bar is shown connected to the lever I which, in a sense, is the equivalent of the arm $i^2$ at the stubble end of the bar $I^1$. By means of the screw bolt $i^4$ and nuts the arm $i^2$ can be adjusted to produce more or less pressure of the arm $i^2$ upon the sustaining bar H; and Fig. 5 is a detail of the supporting bar.

A represents the platform and cutting apparatus of an ordinary harvesting machine, B a part of the main frame, C the main supporting wheel, and D the grain wheel, $B^1$ being the portion of the frame on which the reel adjusting and controlling devices are supported.

E is an arm pivotally supported at its lower end by the bracket $e$, the latter being secured to the harvester frame in any suitable manner. Extending upwardly from the arm E, and pivoted to the upper and forward end thereof, is a bracket $E^1$, that may be considered as a second arm. This bracket forms a support for the reel shaft $E^2$, the latter being journaled in the bearings $e^1$ and $e^2$. Upon the reel shaft is the usual sprocket wheel $E^3$, or gear, as may be desired. The bracket $E^1$ is pivoted to the arm E by means of the pin $e^3$, sustained in suitable bearings on the arm E. On this pin, for convenience, is placed a double sprocket wheel $e^4$. In order that the reel may receive its rotary motion, a sprocket wheel is placed upon the pin $c^2$ and as one part with the sprocket wheel a bevel pinion which receives motion from a part of the harvesting machine. The sprocket wheel and bevel pinion have the mark $e^5$. By means of the chains $E^4$ and $E^5$ the reel may be given rotation, or any of the many forms of gearing may be adapted to perform the same function.

F is a lever preferably pivoted at $f$, directly to the quadrant $f^1$, to which it may be locked by the usual thumb latch device in various positions of adjustment. From this lever, extending forwardly and pivotally connected to the arm of bracket $E^1$, is the rod $f^2$. By means of this lever the bracket may be moved rearwardly or forwardly at will, carrying with it the reel to various positions of fore and aft adjustment. G is a similar lever pivoted to the previously mentioned quadrant $f^1$. While the drawings show but a single quadrant, that may be considered as, in fact, a double one, or of any of the forms on well-known reels, particularly those of this type shown, for instance, in patent to James Macphail, No. 451,943, dated May 12, 1891.

$g^1$ represents a bent rod secured to the arm

E forming, in effect, a short arm projecting upward therefrom, to which the rod $g^2$, reaching to the lever G, is connected. By means of the lever G the outward or forward end of the arm E can thus be raised or lowered.

Extending upward to a high position from the grain-end of the machine platform A, and forwardly to a point above the cutting apparatus, is the arm H adapted to sustain the outer or grain-end of the reel supporting bar I. This bar extends through the tubular reel shaft $E^2$, shown in section in Fig. 3. The bar as a whole being of the form shown in Fig. 3, must be made in two parts in order that it may be passed through the tubular shaft, hence the curved portion is socketed and secured by the bolts $i$ or in any suitable way to the straight portion. Thus constructed the bar I may be passed through the reel shaft and the portion $I^1$ secured thereto. Upon the outer end of the portion $I^1$ is preferably placed an anti-friction roller $i^1$ which travels along the curved portion of the arm H, and as means for sufficiently locking the arm in any fore and aft position to which it may be moved, as required, depressions are provided to receive the roller. This may be considered a locking device, but as it is not necessary that an absolute lock should be provided, the notches serve a sufficient purpose. In some instances, however, the notches, either partially or wholly, may be dispensed with, but some means of sufficient securement is preferred. The bar I, passing stubbleward through the reel shaft, is bent backwardly, in this instance, and for convenience a part $I^2$ is so bent as to be parallel with the main portion. This is merely for the convenience of securing thereto the bar K, which, in turn, is pivoted at its lower end to the arm E at $k$. It will now be observed that the forwardly extending portion of arm E from the pivot $k$ to its outer end at the pivot $e^3$, the upwardly extending arm of bracket $E^1$, the bar K and the part $i^2$ of the bar I, form in fact a parallelogram, as seen in Fig. 2. The effective length of the grainward portion of the supporting bar $I^1$ is substantially the same radial length as the arm E. The result of this arrangement, which forms, in all positions of adjustment, a parallelogram, is that the outer end of the arm $I^1$ always travels back and forth on the arm H in the same path whatever the height of the reel may be. It will readily be seen by reference to Fig. 2 that if the lever G be moved forward or backward the arm of bracket $E^1$ will be moved upward or downward both at the upper and lower extremities on arcs of circles controlled by the arms E and $I^1$, and if the lever F be moved in either direction the upper end of the bracket or arm $E^1$ will be moved backward or forward and, because of the control due to the parallelogram, the roller on the arm I will traverse the curvature of the higher portion of the arm H, said curvature being struck as if from the pivot $e$; in other words, extended grainward. A moment's reflection, upon referring to Fig. 2, will show that the path of movement of the outer end of the arm $I^1$ will correspond to a curvature struck from the pivot $e$. The fact that the parts will always form a parallelogram, however adjusted, is proof of the further fact that a line between the outer end of the arm $I^1$ and an equivalent imaginary position at the grain end of the machine is strictly horizontal with a line passing through the pivot $e^1$, will remain the same.

In the modification (Fig. 4) another type of reel is shown, but the same broad principle finds embodiment, although the minor details of the preferred form of reel are not required. In this instance a single lever L is provided, the portion $l$ serving as means for raising and lowering the reel, the latter being journaled in a bracket $l^1$ on the standard $i^2$. This standard is provided with the usual series of notches or holes and a pawl placed upon the bracket $l^1$ of a usual form may be used for sustaining the bracket. $l^3$ is an oscillating standard, of a well-known form, pivoted at $l^4$ to the portion of the frame $B^1$, on which is also secured the quadrant $l^5$. The upper end of the standard $l^3$ may be slotted and the pin that forms the fulcrum of the lever L pass therethrough. From the said pin down to the latch $l^6$ may pass a rod and thus, by slightly lifting the lever, the latch may be disengaged from the quadrant. Upon the bar I, at the stubble end, is the arm $I^2$, and upon the lever L is the screw bolt $i^4$, with nuts. This bolt passes through the arm $I^2$ and, by means of the nuts, adjustments can be made which will produce more or less pressure of the arm $I^2$ upon the sustaining bar H. This is for the purpose of creating sufficient pressure to hold the end of the arm sufficiently steadily into the notches of the bar H. The same is accomplished when the support is applied to the form of reel shown in Figs. 1 and 2 by having the holes in the socket for the bar or arm $I^1$ slotted, as shown in Fig. 5, the socket being secured by suitable rivets to the portion $I^1$. By loosening the bolts $i$ the arm $I^1$ and socket may be adjusted slightly. I provide no positive latch at the grain-end of the support, as I find none necessary if sufficient weight of the reel be there supported, but I treat the arrangement as a locking device; it being simpler than to provide special means which may in any other manner be controlled by the operator when moving the reel, I prefer it. The forward curved end of the bar H may be considered as a retaining quadrant as well as a support. In order that the grain-end of the arm I¹ may be prevented from becoming displaced relative to the support H, I provide the stirrup $i^5$, which may hang from the side of the roller, if roller be used, passing under the support H.

What I claim as being my invention, and desire to secure by Letters Patent, is:

1. In a harvesting machine, in combination, an adjustable reel-sustaining support comprising a projecting arm pivotally connected to the harvesting machine frame, an arm pivotally supported at the free end of said horizontally projecting arm, a reel-sustaining bar provided with an arm parallel with said first mentioned arm, a bar connected to said first mentioned arm and said horizontally projecting arm of the reel-sustaining bar, said parts forming, in effect, a parallelogram, a reel shaft adapted to be rotated upon said reel-supporting bar, a support at and over the grain end of the receiving platform, an arm as one part with the reel-sustaining bar of substantially the same radial length as the first mentioned arm and adapted to rest upon the said arm at the grain end of the receiving platform, and means for adjusting the reel to the various required positions.

2. In a harvesting machine, in combination, an adjustable reel-sustaining support comprising a projecting arm pivotally connected to the harvesting machine frame, an arm pivotally supported at the free end of said horizontally projecting arm, a reel-sustaining bar provided with an arm parallel with said first mentioned arm, a bar connected to said first mentioned arm and said horizontally projecting arm of the reel-sustaining bar, said parts forming, in effect, a parallelogram, a reel shaft adapted to be rotated upon said reel-supporting bar, a support at and over the grain end of the receiving platform, an arm as one part with the reel-sustaining bar of substantially the same radial length as the first mentioned arm and adapted to rest upon the said arm at the grain end of the receiving platform, said last mentioned support provided with means adapted to check horizontal movement of the grain end of said reel-sustaining bar.

3. In a harvesting machine in combination, an adjustable reel-sustaining support comprising a projecting arm pivotally connected to the harvesting machine frame, an arm pivotally supported at the free end of said horizontally projecting arm, a reel-sustaining bar provided with an arm parallel with said first mentioned arm, a bar connected to said first mentioned arm and said horizontally projecting arm of the reel-supporting bar, said parts forming, in effect, a parallelogram, a reel shaft adapted to be rotated upon said reel-supporting bar, a support at and over the grain end of the receiving platform, an arm as one part with the reel-sustaining bar of substantially the same radial length as the first mentioned arm and adapted to rest upon the said arm at the grain end of the receiving platform, and means for varying the pressure upon the last mentioned support.

JOHN F. STEWARD.

Witnesses:
 CLYDE C. PALMER,
 F. W. HOFFMEISTER.

Copies of this patent may be obtained for five cents each, by addressing the "Commissioner of Patents, Washington, D. C."